May 6, 1952

J. A. MORTON 2,595,691

SIGNAL RESPONSIVE CIRCUIT

Filed Oct. 5, 1943

INVENTOR
J. A. MORTON
BY Hugh S. Wertz
ATTORNEY

Patented May 6, 1952

2,595,691

UNITED STATES PATENT OFFICE 2,595,691

SIGNAL RESPONSIVE CIRCUIT

Jack A. Morton, Plainfield, N. J., assignor to Bell Telephone Laboratories, Incorporated, New York, N. Y., a corporation of New York Application October 5, 1943, Serial No. 505,029

20 Claims. (Cl. 343—13)

This invention relates to apparatus for utilizing pulses and other signals, and, in an important specific aspect, to means for distinguishing between signals and noise in radio object-location systems and in other systems using similar signals. In other aspects, the invention relates to telephony, telegraphy, facsimile and other forms of image transmission, and to the transmission of telephone, telegraph, or image signals through heavy interference.

In many radio object-location or range-finding systems, frequently called "radar" systems, ultra-short carrier waves modulated with spaced pulses are directively emitted from a transmitting station and caused to strike objects within a particular region, causing echoes or reflections therefrom which are received by a receiving system at the transmitting point. After detection, various echo pulses produced by the reflection of a transmitted pulse from objects at various distances from the transmitting point are observed on the screen of a cathode ray oscilloscope along with a pulse corresponding in time to the emission of the transmitted pulse. The pulses are indicated by displacements of the beam perpendicular to the direction of scanning in the cathode ray oscilloscope. The various pulses are interspersed with noise and the noise distorts the successive presentation of the train of echo signals (or of the single echo if but a single object is being impacted by the transmitted pulses) in an erratic way, and in addition causes spurious variations before and after, or before or after, some or all of the echoes. This arrangement has proved useful in distinguishing the signal from the random noise effects. The purpose of this apparatus is to obtain an indication on a viewing screen of the time-spacing of the pulses.

The present invention is an outgrowth of a study to determine whether an arrangement could be devised which would improve the distinguishability of the signal from the noise. The echo signals are periodic in character while the noise effects have a random distribution. Consideration of this property of the signal led to the conclusion that an improvement would be effected by adding the signals and noise of successive signal periods and obtaining an indication of the summation on a viewing screen.

An object of the invention is to provide apparatus for improving the signal-to-noise ratio in signaling systems, noise being considered to be any unwanted variations of different periodicity than the signal and mixed therewith.

Another object of the invention is to provide apparatus for handling periodically produced substantially identical signal variations along with spurious or unwanted variations of random distribution in a manner to improve the ratio of wanted to unwanted variations.

The unwanted variations (noise) may be any disturbances of irregular occurrence or they may be periodic variations which because of the relation of their periodicity to that of the signal have in effect a random distribution, from the point of view of their location within successive signal periods.

In an important aspect, the invention may be characterized as means for adding periodically repeated substantially identical signal variations along with spurious or noise variations, which do not have the periodicity of the signal and may be characterized generally as variations of random distribution, and for presenting to view the summation of the signals and spurious variations occurring during a plurality of periods of the signals, all depicted spatially on a time basis, or for obtaining a summation record of this kind which may later be viewed.

It is another object of the invention to provide effective means for storing energy in accordance with periodically recurrent pulses or trains of pulses or other signal variations and for utilizing the stored energy to obtain other pulses or trains of pulses, or other signal variations.

In accordance with one specific illustrative embodiment of the invention as applied to range-finding, successive trains of voltage variations at the receiver, each train extending over an interval corresponding to the time between transmitted pulses (or a fraction thereof) and comprising a number of echo pulses interspersed with spurious variations (and, if it is not blanked out, by means under control of a pulse from the transmitter, for example, a received pulse corresponding to the transmitted pulse), are used to modulate a focussed beam of electrons in an oscilloscope tube, and produce on the fluorescent screen thereof a strip or field of light for each train, these fields being superposed so that the indications representing echoes of successive trains appear in substantially the same place on the screen while those representing noise appear in general at different places for successive fields. An image of these successive strips or fields is focussed optically upon the mosaic target of a conventional television electron camera tube such as, for example, an "Iconoscope." Charges accumulate on the mosaic elemental areas corresponding in position to the echoes, the charges for each of a series of trains being added. This, then, is an addition of the echoes which occur in the same position or phase in each train. Since the noise effects have a random distribution, one may characterize the accumulation of the resultant charges as random-distribution addition. All of the charges accumulated during a series of trains are removed by the scanning beam in the camera tube which sweeps across the target once for each series, which may, for example, consist of twenty trains. The current variations thus obtained are representative of the integrated effect of many "pictures" on the oscilloscope screen and these current variations are applied to one pair of deflecting plates in a second oscilloscope, the beam in this tube being swept at a frequency equal to the scanning frequency in the camera tube. The screen of the second oscilloscope shows the final integrated "picture" or trace. In this final trace the height of the echo pulse representations is relatively very great compared with the noise representations.

There is also preferably provided, in accordance with the invention, a signal clipper or amplitude limiter to initially reduce any spurious variation of larger amplitude than the signals to the maximum amplitude of the latter.

In the arrangement in accordance with this invention described above, the eye is not called upon to distinguish between intensities or degrees of brightness, but between heights or amplitudes. The eye is adapted to perform the latter function much more accurately than the former. In applicant's described arrangement the differentiation may be characterized as spatial. However, in a broader aspect the invention is not limited to this feature of spatial differentiation, since it will be obvious that brightness differentiation may be relied upon where the additive effects are great enough to cause brightness differences to give all the differentiation necessary or desired.

As mentioned above, this invention, while originally made to solve problems arising in the field of range-finding and object-locating, is, in its broader aspects, not limited to these fields. The underlying principles are applicable to facsimile or picture transmission, telegraphy and other forms of signaling; particularly where static or other disturbances are severe and where the principal object is to receive an intelligible signal even though static or other spurious effects are still discernible. As an illustration of this aspect of the invention, consider a typewritten sheet transmitted, as in ordinary picture transmission, by the well-known method consisting of line-by-line scanning of the picture or other subject-matter held on the surface of a rotating drum, the resulting current variations after transmission and suitable amplification being used to control the intensity of a beam of light focussed upon a paper or film blank having a coating of light sensitive emulsion of the kind used in photography, the blank being scanned line-by-line in synchronism with the scanning at the transmitter. If static effects or other spurious disturbances of larger amplitude than the signal variations are present in the received current, portions of the message will be blotted out or rendered unintelligible. In accordance with this invention, this blotting out of portions of the message may be avoided as follows: at the receiver, a clipper is adjusted to remove those portions of the disturbing variations which lie beyond the signal amplitude range. The clipped signal train is then amplified, the gain of the amplifier being adjusted so that the signal intensity is only one half, for example, what it would be if there were to be only one transmission. There results a weak reproduction on the blank at the receiver, in which portions are nearly or quite blotted out by the spurious variations. The transmission process is then repeated. In general, the spurious effects will be differently distributed over the time of this transmission than during the first transmission. The light sensitive emulsion will now be exposed a second time, thus doubling the total time of exposure and producing a reproduction of standard density characteristics. The spurious variation effects, unless they happen to occur at corresponding times in the two transmission periods, no longer blank out the message. To reduce the chance of addition-in-phase of some of the spurious variations, additional transmissions can be made, the received current in each case being reduced, by adjustment of the gain of the amplifier or by any other suitable means, from normal to a fraction thereof corresponding to the number of transmissions. The addition of the signal variations in phase in the repeated trains of signals and the addition in random phase of the spurious variations here take place in the emulsion at the receiver. Other means of adding the variations may be used, the "Iconoscope" arrangement described above being an example. The necessary reduction in received current strength may, if desired, be made prior to clipping, at the receiver or at the transmitter, the clipper at the receiver being adjusted accordingly. A telegraph message in code or a telephone message, may, of course, be repeated by being first set up on a tape or other record which is then repeatedly read and transmitted, the addition of variations in the received current being effected by reproducing the signal in photographic emulsion or by the use of other means capable of giving additive effects.

The invention will be more readily understood from the following amplified descriptions of embodiments thereof taken in connection with the accompanying drawings, in which.

Figures 1, 2, 3, 4, 5:
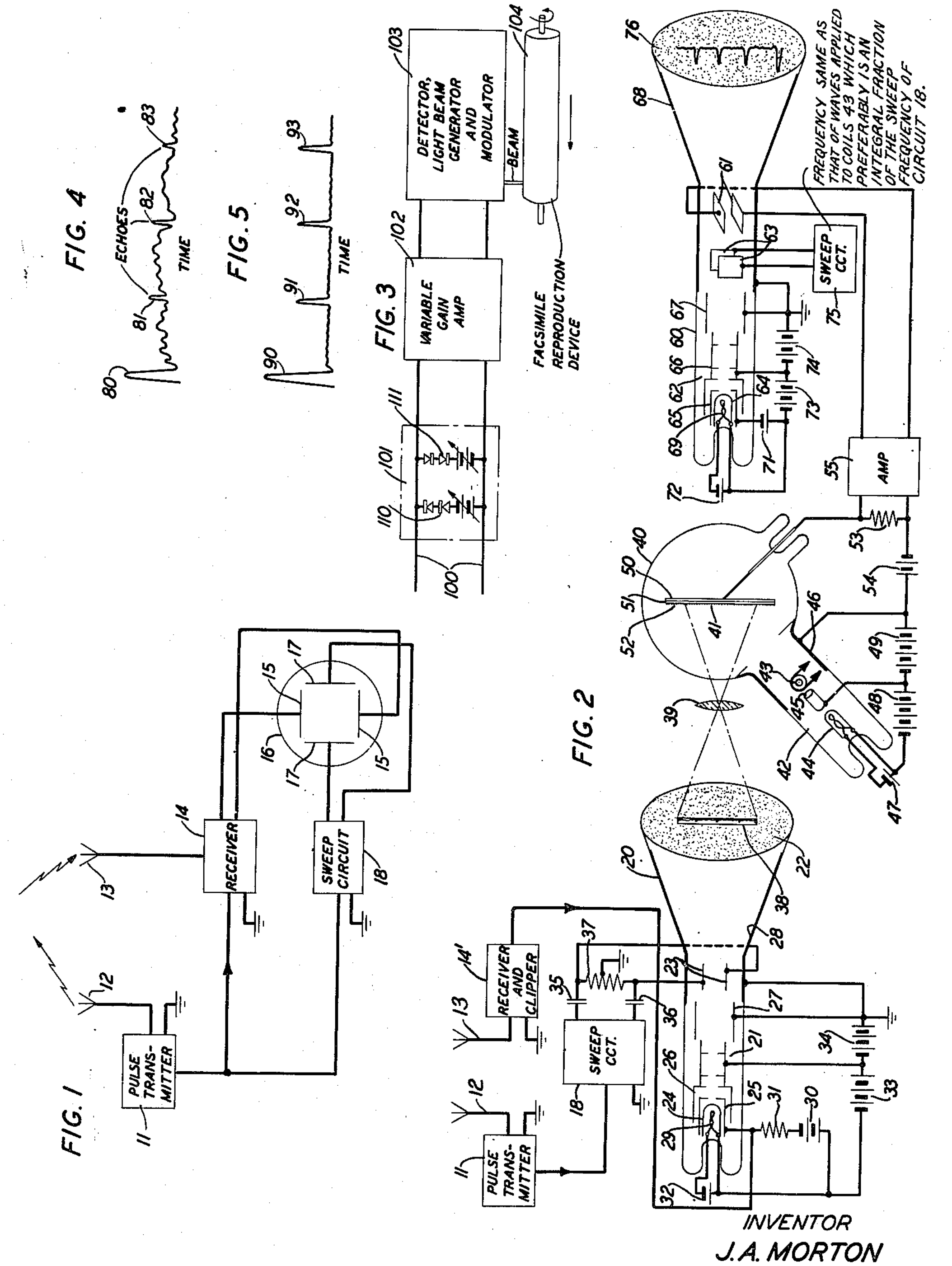
Fig. 1 shows in greatly simplified form a radio range-finding system of the prior art.
Fig. 2 is a schematic diagram of a radio range-finding arrangement in accordance with the invention.
Fig. 3 is a diagrammatic showing of facsimile receiving apparatus in accordance with the invention; and, Figs. 4 and 5 are graphical representations to aid in understanding the invention.

Referring more specifically to the drawings, Fig. 1 shows in greatly simplified form a radio range-finding system of the prior art, while Fig. 2 is a schematic diagram of a radio range-finding system shown by way of example to illustrate the principles of novelty of this invention. In the arrangement of Fig. 1, a pulse transmitter 11 produces pulses at any suitable periodicity such as, for example, 400 per second, and each of a length of from one (or a fraction thereof) to ten microseconds, and causes these pulses to modulate a suitable ultra-high frequency carrier which is transmitted by the antenna 12 in the form of bursts or pulses of high frequency waves. By way of example, transmitter 11 can comprise an oscillator for providing a sine wave and having a suitable periodicity which can conveniently be 400 cycles per second. This oscillator energizes a pulse generator of any one of several suitable types well known to the art; for example, see United States Patent 2,117,752, issued May 17, 1938 to L. R. Wrathall, which provides an energy pulse at a particular point of each cycle of the input wave supplied to it. The pulses from the pulse generator are then applied along with the carrier to a modulator of any suitable type. The modulated waves are then applied to the transmitting antenna 12. Waves reflected from one or more objects within the range of the transmitting antenna 12 are received by the receiving antenna 13. The antennas 12 and 13 are of any suitable type; they can be, for example, of the polystyrene "polyrod" type disclosed in an application of G. E. Mueller, Serial No. 469,284, filed December 17, 1942, Patent No. 2,425,336 issued August 12, 1947. The reflected waves picked up by the receiving antenna 13 and also pulse modulated waves from the transmitter are applied to a receiver 14 of any suitable form wherein they are amplified, detected, and applied to one set of deflecting plates 15, 15 in the cathode ray oscilloscope 16, which can be of any well-known type. Supplied to the other set of deflecting plates 17, 17 in the oscilloscope 16 is a sweep wave of saw-toothed form produced by a suitable sweep circuit represented by the box 18 in Fig. 1. For an example of a suitable sweep circuit, see Patent 2,178,464, issued October 31, 1939 to M. W. Baldwin, Jr. Pulses from the pulse generator in the transmitter are used to initiate each of the sweep waves so that the beam in the cathode ray oscilloscope 16 starts sweep cycles synchronously with the transmission of pulses. If desired, the sweep wave can be initiated a predetermined time after the transmission of each of these pulses by employing suitable delay means. Moreover, so-called "expanded" sweep waves can be utilized if it is desired to view only a portion of the video signal with this portion being spread out or amplified in the direction of sweeping. Variable delay means are ordinarily used with expanded sweeps. For an example of an expanded sweep generator and variable delay means, reference is made to Patent 2,244,513, issued to E. T. Burton on June 3, 1941.

In the arrangement of Fig. 1, there is produced on the screen of the oscilloscope 16 a "type A scan," that is, a plot of signal intensity appearing as a vertical deflection from a base line on the cathode ray oscilloscope screen, distance along the base line representing range. Such a plot is shown in Fig. 4. The start of each sweep or scan is preferably synchronized with the outgoing or transmitted pulse which produces a deflection 80 on the screen. Returning echoes 81, 82 and 83 are then indicated by displacement of the beam perpendicular to the direction of scanning. In the "type A" scan there is some cumulative effect with time due to lag in the phosphor.

In accordance with the aspect of the present invention illustrated in the embodiment shown in Fig. 2 a trace, such as that shown in Fig. 5, is obtained from trains of signals of the type represented in Fig. 4 by storing the signals corresponding to the ordinates for each abscissae separately, over a period corresponding to that of the number of scannings desired, and then erasing the stored signals and utilizing the current resulting from said erasure to produce a final trace such as that shown in Fig. 5. It should be apparent, however, that the invention in its broad aspects is not limited to use with signal trains consisting of separated pulses.

In the arrangement of Fig. 2, the transmitter 11, the transmitting antenna 12, the receiving antenna 13, and the sweep circuit 18 are similar to the corresponding elements of the system of Fig. 1. The receiver 14', however, in addition to the elements in the receiver 14, preferably includes a clipper, such as the amplitude limiting circuit disclosed in an application of D. Mitchell, Serial No. 464,271, filed November 2, 1942, Patent No. 2,395,575 issued February 26, 1946, for limiting the intensity of all voltage variations to that of the maximum signal desired. By way of example, the clipper will remove all voltage variations above that of the strongest echo. The final oscilloscope 60 is similar to the corresponding piece of equipment 16 in Fig. 1 except that the frequency of the sweep wave applied thereto is different from that used in the oscilloscope 16 of Fig. 1. In addition, two cathode ray tubes 20 and 40 are provided. Tube 20 is in general similar to an oscilloscope except that only one pair of deflecting plates or coils is used and the beam is modulated with signals instead of having the signals cause a vertical deflection of the beam therein. The tube 40 is similar to an electron camera tube used for television. The tube 40 shown in the drawing is the well-known "Iconoscope" with one pair of deflecting means omitted.

The tube 20 comprises an evacuated container enclosing an electron gun 21 for generating and accelerating a beam of electrons and focussing it upon a fluorescent screen 22, and a pair of electrostatic deflecting plates 23, 23 for causing the beam of electrons to scan a linear region of the screen 22. The electron beam generated by the gun 21 is modulated by the output from the receiver 14 in a manner which will be described more completely below.

The electron gun 21 preferably comprises a cathode 24, a control electrode or member 25, a first anode member 26, and a second and final anode member comprising a cylindrical member 27 and a coating 28 of conducting material on the inside wall of the envelope extending from the region of the cylinder 27 to the region of the fluorescent screen 22.

The control electrode 25 is placed at any suitable negative potential with respect to the potential of the cathode 24 by means of the source 30 and the resistor 31, the positive terminal of the source being connected to the cathode 24. The video signal from the receiver 14 is applied to the control electrode 25. The cathode 24 is heated by a heater 29 which receives current from a source 32 connected thereacross. The first anode 26 and the final anode 27, 28 are placed at appropriate positive potentials with respect to the cathode 24 by means of the source 33 and the source 34. The negative terminal of the source 33 is connected to the cathode 24 while its positive terminal is connected to the member 26 and to the negative terminal of the source 34, the positive terminal of which is connected to ground and to the final anode member 27, 28. The potentials applied to the various electrode members and their location and shape are such that a beam of focussed electrons strikes the fluorescent screen 22.

The beam generated by the electron gun 21 is caused to be deflected over a linear path of the fluorescent screen 22 by means of appropriate potentials applied to the deflecting plates 23, 23 by the electrostatic sweep circuit 18 which, as mentioned above, may be of the type shown in Patent 2,178,464 dated October 31, 1939 to M. W. Baldwin, Jr. which discloses balanced electrostatic sweep circuits suitable for this purpose. Sweep circuit 18 is connected to the plates 23, 23 by means of coupling condensers 35 and 36 while the resistance 37 of the value of many megohms is connected across the plates 23, 23. The mid-point of the resistance 37 is connected to ground so that the average of the potentials of the deflecting plates does not deviate more than slightly from the potential of the final anode 27, 28. This relationship is maintained to avoid changes in the sensitivity of the deflecting system and the consequent distortion which would otherwise result. The sweep circuit 18 is synchronized by pulses from the transmitter 11 so that each sweep wave is actuated by a pulse from the transmitter or from some pulse having a constant time relationship thereto. If desired, a delay circuit (not shown) and which may be variable, may be included in the circuit between the pulse transmitter 11 and the sweep circuit 18. The sweep circuit causes the beam in the tube 20 to contact in turn each of the elements of a linear strip 38 of the fluorescent screen 22 within the time interval corresponding to the period between two successive pulses from the transmitter 11. As the intensity of the cathode ray beam during the sweep movement is varied by the signal from the receiver 14′, which signal comprises pulses corresponding to the transmitted pulses (unless they have been blanked out), echo pulses from each object which has been struck by the pulses transmitted from the sending antenna 12, and spurious variations which are generaly designated "noise," the linear strip 38 on the fluorescent screen has a pattern of bright spots corresponding to the transmitted and echo pulses 80, 81, 82 and 83 on a flickering background corresponding to the noise. An image of the strip 38 is focussed by means of a suitable lens system represented by the single lens 39 upon the target 41 in the tube 40, the tube 40 being, as pointed out above, a standard electron camera tube of the iconoscope type.

Briefly stated, the tube 40 comprises a gas-tight container enclosing an electron gun assembly 42 for producing a moving beam of electrons and for accelerating this beam towards the screen 41, and suitable means such as, for example, deflecting coils 43, 43 for causing the beam to scan the various illuminated elemental areas of a linear field on the screen 41.

The electron gun assembly 42 comprises a cathode 44 and an anode 45 for producing a beam of electrons, and an anode 46 (which may be a conducting coating of any suitable material, such as, for example, sputtered platinum, inside of the tube and extending along the surface thereof) for accelerating the beam towards the screen 41. A source 47 supplies current to heat the cathode 44. Another source 48 places the anode 45 at a positive potential with respect to the cathode 44 and a source 49 places the anode 46 at a higher positive potential than the anode 45. A sweep circuit, not shown, but which may be of any well-known form, is connected by any appropriate means to the deflecting coils 43, 43 to cause the electron beam to scan every elemental area in turn of the linear strip on the target 41, this field being at least as large as the focussed image of the strip 38 upon the front surface of the mosaic target 41. For examples of suitable magnetic sweep circuits, reference is made to an application of F. R. Norton, Serial No. 391,377, filed May 1, 1941, Patent No. 2,315,073 issued March 30, 1943. While deflecting coils have been shown, it is obvious that any other means for producing the deflection of the beam may be used instead, as for example, electrostatic deflecting plates as in the tube 20 and as in the case of the tube 60 which will later be described. The sweep circuit for the tube 40 is synchronized with that for the tube 60 by any suitable means and, if electrostatic deflecting plates are used (instead of coils) in the tube 40, the sweep circuit 75 for the tube 60 can be connected to the deflecting plates in the tube 40 also. By any suitbale synchronizing means, such as that used for synchronizing the frame scanning and line scanning sweep waves in television, the sweep circuits 18 and 75 (and that used for the tube 40 if it is different from the circuit 75) can be synchronized so that the sweeping frequency in the tubes 40 and 60 is an integral fraction of that in the tube 20 and, preferably, so that each sweep in the tubes 40 and 60 starts with a sweep in the tube 20.

The mosaic screen 41 comprises a metal backing plate 50, a layer 51 of suitable insulation such as mica or glass, and a discontinuous layer of discrete photosensitized globules 52. The backing plate 50 is connected through the signal resistor 53 and the source 54 to the final anode member 46, the positive terminal of the source 54 being connected to the member 46 in order to positively bias by a few volts the member 46 with respect to the target 41. For a more complete description of the tube 40 briefly described herein together with a method of making the target 41, reference is made to Patent 2,173,923, issued September 26, 1939, to G. K. Teal. For a more complete description of the theory and method of operation of a tube of this type, reference is made to an article entitled "The Iconoscope" by V. K. Zworykin in the January 1934 Proceedings of the Institute of Radio Engineers, pages 16 to 32, inclusive, and to an article by the same author in the July 1936 "R. C. A. Review," page 60, entitled "Iconoscopes and Kinescopes in Television."

Signal currents produced by the scanning of the mosaic target 41 by the beam in the tube 40 are amplified by the amplifier 55, which may be, for example, a multistage amplifier. The amplified signals are then applied to the deflecting plates 61, 61 in the cathode ray oscilloscope 60. Tube 60 may be of any suitable type used for oscilloscope purposes. It may comprise, for example, an electron gun 62, two pairs of electrostatic deflecting plates 61, 61 and 63, 63, and a fluorescent screen 76. The gun 62, for example, is similar to the electron gun 21 in the tube 20 and comprises a cathode 64, a control element 65, a first anode member 66, a second anode member 67, 68 and a cathode heater 69. The members 64 to 69, inclusive, correspond respectively to the corresponding members 24 to 29, inclusive, in the tube 20. Sources of direct potential 73 and 74, corresponding to sources 33 and 34, are provided to supply proper anode potentials for the anode members 66, 67 and 68; source 72 is utilized to supply heating current to the heater 69; and source 71 is used to apply a negative biasing potential to the control element 65. Unlike the circuit of the tube 20, however, no modulating signals are applied to the control element 65 as the beam in the tube 60 is not caused to be varied in intensity during the operation thereof.

Connected to the deflecting plates 63, 63 is the sweep circuit 75 which may be of any suitable type; for example, it may be similar to the sweep circuit 18. As pointed out above the frequency of the sweep circuit 75, however, is only a fraction such as, for example, one-twentieth, of the frequency of the sweep circuit 18, but is equal to that of the frequency of the sweep circuit for the tube 40. Thus, for example, if the strip 38 in the fluorescent screen 22 of the tube 20 is scanned four hundred times per second and the field on the target 41 of the tube 40 is scanned twenty times per second, twenty complete trains of impulses (or twenty selected portions thereof if an expanded sweep circuit is used) modulate the beam of the tube 20 during each scanning of the field on the target 41 in the tube 40. Charges are thus stored up for one-twentieth of a second before they are removed by the scanning beam in the tube 40.

The method of operation of the system shown in Fig. 2 is as follows: Pulses are sent out from the transmitting antenna 12 and received by the receiving antenna 13. Between transmitted pulses, an echo signal produced by reflections of the transmitted pulse from one or more objects or targets is received by the receiving antenna and, with the pulse corresponding to the transmitted pulse and the accompanying noise, produce a train of electrical variations. The successive trains, after each has been obtained from the carrier by detection and amplified and clipped in the receiver 14′, are applied to the control element 25 in the tube 20 to modulate the beam therein in accordance with the variations of the trains. By proper adjustment of the clipper in the receiver 14′, any noise or other spurious variations larger than the maximum signal are not passed to the tube 20. These variations in the trains are represented by the graphical representation shown in Fig. 4. The pulse 80 corresponding to the transmitted pulse is shown at the left of Fig. 4 while three echo pulses 81, 82 and 83 have also been shown. In between the pulses are various other variations representing the spurious variations of the detected current. As is well known, these spurious variations do not often have their peaks in the same places in successive trains of signals whereas, for a number of trains at least, the echo pulses are in the same positions in each train. For this reason the pulses indicated by the reference characters 80, 81, 82 and 83 in Fig. 4 are represented by spots in the strip 38 which are somewhat brighter than the regions between these spots (there is lag in the phosphor which prevents complete cessation of light emission before the spot is again struck by the beam), while the noise peaks, due to the fact that their positions vary throughout the various trains, produce a somewhat less bright and flickering background for the brighter spots. The image of the strip 38 is focussed upon the target 41 in the tube 40 where charges accumulate on the mosaic elemental areas corresponding to the different portions of the strip 38, which charges would be in proportion to the total time during which the images of the echoes are focussed upon the mosaic, that is, for one-twentieth of a second, if the illumination were constant during this time. There is, of course, some fading of the illumination during this time. The charge which accumulates on each elemental area of the mosaic corresponding to a portion of the strip representing noise between echoes is relatively small because of the random distribution of the noise peaks by reason of which peaks do not often occur at the same position in the different trains. The accumulated charges are removed periodically by the scanning beam in the camera tube 40 which sweeps across the illuminated part of the target corresponding to the strip 38 once every one-twentieth of a second, or in other words, once for every twenty sweeps of the oscilloscope beam in the tube 20. There is thus set up in the signal resistor 53 an image current which is representative of the integrated effect of many traces on the oscilloscope screen strip 38. These current variations are applied to the deflecting plates 61, 61 in the tube 60, the beam in this tube being swept at a frequency equal to the scanning frequency in the camera tube 40 by means of the sweep circuit 75. The screen 76 of the tube 60 shows the final integrated "picture" of Fig. 5. This figure shows the pulses 90, 91, 92 and 93 which are accentuated relatively to the noise.

Instead of sweeping the beam in the tube 20 in one dimension only, a second pair of deflecting plates may be provided and the beam swept in two dimensions to produce bright lines of light instead of the bright spot indicated in Fig. 2. A cylindrical lens can be used, if desired, to condense the two-dimensional field into a linear strip at the camera tube mosaic. The operation of the arrangement is otherwise the same as set forth above.

The specific sweep frequencies of 400 cycles per second for the tube 20 and 20 cycles per second for the tubes 40 and 60 are given merely by way of example. Obviously, these frequencies may vary within fairly wide limits.

Reference will now be made to Fig. 3, which is a diagrammatic showing of an example of a broad application of the principles of the invention to other forms of signaling, the example here chosen being facsimile reproduction. Current is received over the leads 100 after being amplified, if necessary. This current is in the form ordinarily produced by complete line-by-line scanning of a drawing or of printing with a beam of light chopped at high frequency, for example, along with spurious variations. Clipper 101 is of any well-known form having means for adjusting the clipping levels. For a description of a suitable example of a clipping vacuum tube circuit which may be used, reference is made to the amplitude limiting device in the above-mentioned Mitchell application. This device has been indicated in Fig. 3 and comprises two circuits 110 and 111 connected across the lines 100, each being non-conducting to signals in the desired range of signal intensities and each comprising a series arrangement of one or more asymmetrically conducting devices and a biasing source of potential. The circuit 110 is oppositely polarized with respect to the circuit 111 so that excessive noise peaks in both positive and negative directions can be clipped by causing one or the other or both of the two circuits 110 and 111 to become conducting. By varying the biasing, the clipping levels (both positive and negative) can be varied to correspond to the amplitude of the largest signal or to any lesser value, if desired. (In facsimile transmission of printing, the signals all have about the same amplitude.) The clipped signals are then applied to a variable gain amplifier 102, of any suitable form, the gain being adjusted by an amount depending upon the number of times the picture or other object is scanned. Thus, if the object is scanned twice, the signal strength is made one-half of that in the case where the object is scanned only once. The amplified signals from the device 102 are then detected and the detected signals applied to a light beam generator and modulator of any form suitable for facsimile systems, and caused to modulate the light beam therein. The detector and the light beam generator and modulator have been indicated schematically by the block 103. The light beam is caused to move over the facsimile reproduction device 104, which comprises a rotating drum bearing a photographically sensitized paper or film, within a period corresponding to one scanning of the object at the transmitter. Due to the low signal strength, only a weak reproduction (or latent image) is produced, but after two scannings, in the specific example selected, the latent image is of full strength as far as the portions thereof corresponding to the true image signals are concerned but not of this strength as far as the noise or spurious variations are concerned. This will be clear from the description of the method of the operation of the device shown in Fig. 2.

A number of other modifications can be made as it is obvious that the principles involved are capable of a variety of other applications. A few of these will be mentioned by way of example. In general, in any case where the speed of transmission of an intelligence is not important and the information can be repeated, the integration method will yield improvement in intelligibility. The information may be repeated many times and integrated in such a fashion that the desired intelligence adds proportional to the number of recurrences, whereas the undesired interference adds in random fashion. By way of example, a short telegraph or a telephone message (or a portion of a longer message) may be stored on a magnetic tape and then transmitted over and over by running it cyclically past a transmitting pickup; then the received messages are stored on a synchronized magnetic tape or by means of equipment similar to that shown in Fig. 2. The integrated message is removed after a sufficient number of messages have been stored. Other portions of a longer message can then be handled in a similar way. Moreover, the equipment shown in Fig. 2 up to and including the tube 40 may be utilized to produce a signal train which is the result of the integration of a multiplicity of similar signal trains, each train representing, for example, the image current or voltage produced by scanning a line of a picture at the transmitter one time. The integrated train may then be used to modulate the usual picture reproducing apparatus at the receiving station but at a lesser speed than in the case where the integration method is not utilized. Other lines of the picture are then produced in the same way. Of course, the whole picture can be scanned before repeating, if desired. It is important in all such devices either to have a storage system capable of a large linearity range or, preferably, to clip out large interference signals before they reach the storage device. It is also useful to be able to block out, by any well known means, large accumulated direct current components which result from many recurrences. As applied to radar systems, the integrated signal trains can be applied to one pair of deflecting plates in the oscilloscope to produce a "class A" trace or to the control element in the oscilloscope to produce a trace in which brightness varies in accordance with the intensity of the signal, or they may be utilized in any other manner that the usual video signal output of a radar receiver is utilized. The integration method can also be utilized to produce a series of pulses from similarly shaped pulses having a much higher rate of repetition but each of which has a shorter duration.

What is claimed is:

1. Means for distinguishing a signal from unwanted variations of random occurrence comprising clipping means, means for impressing upon said clipping means the signal in the form of variations repeated at least once along with spurious variations randomly distributed, to form series of mixed variations, said clipping means being set to suppress all portions of said mixed variations which lie outside a predetermined amplitude range about equal to or less than that of the signal range, and means to obtain a record representative of said first series of mixed variations after passing through said clipping means and to repeat the recording for each succeeding series to increase the degree of recording substantially in proportion to the number of series, whereby any clipped portions of the unwanted variations substantially mask concurrent portions of the signal in the record as formed from the first of said series but the completed record of the signal is of such strength as to override the unwanted variations except where the latter which have been clipped occupy the same position in all of said series.

2. The combination of claim 1 in which said recording is electrostatic and said recording means includes a target which emits radiations under impact of a beam of energy, means for generating a beam of energy and repeatedly sweeping it over the same path on said target, means for modulating said beam with said series of variations in succession at the sweep frequency of said beam, and means for setting up current variations under control of the radiations from said target including an array of photoelectric elements and condenser elements.

3. The combination of claim 1 in which said recording means comprises a record blank of photographic emulsion, means for producing a beam of energy modulated in accordance with said series of mixed variations and for directing it to said record blank, and means for producing relative movement between said beam and said blank.

4. The combination of claim 1 in which said recording means comprises electrostatic storage means for accumulating a plurality of stored charges representative, respectively, of the sums of those amplitudes of the mixed-variation-increments which correspond in time-position in the different series, and means for producing a two coordinate indication, one of the coordinates representing elapsed time and the other being under control of said stored charges in succession.

5. The combination with a target which radiates electromagnetic waves under impact of a beam of energy and which continues radiating for some time after being impacted, of means for generating a beam of energy, means for repeatedly sweeping said beam over the same linear path on said target at the same speed, means for giving said beam substantially the same signal intensity modulations during each of a plurality of successive sweeps, an electric storage element comprising a layer of dielectric material backed by an electrically conductive element and having a facing of photoelectric material, means for causing radiations from any wave-emitting portion of said target to impinge upon a corresponding portion only of said photoelectric material, whereby an electric charge record is produced in said storage element, and means for restoring said storage element to its original condition at a frequency which is much smaller than the sweep frequency of said beam.

6. The combination with an electron beam target capable of emitting light when energized by a beam of electrons and of continuing to emit light for a period thereafter, of means for generating a beam of electrons and causing it to scan repeatedly at a fixed periodicity a portion at least of said target, means to impress upon said beam intensity modulations in accordance with a signal of such a nature that at least one portion of said target is periodically impulsed to the degree required to cause light to be emitted, an electrical storage element comprising a layer of dielectric material backed by an electrically conductive element and having a facing of photoelectric material, means for causing light from any light-emitting portion of said first target to illuminate a corresponding portion only of the facing of said second target whereby photoelectrons are emitted from any illuminated part or parts of said facing thus raising the potential of said part or parts, and means for restoring said illuminated part or parts to their original potential periodically at a frequency which is much smaller than that at which said light-emitting part or parts of said target are energized by said beam, said restoration being effected so as to produce current variations dependent upon the change in potential of said illuminated part or parts produced by said restoration.

7. Means for differentiating between time-spaced variations occurring at a substantially fixed periodicity and non-periodic variations intermixed therewith comprising means for producing a space-current beam, means for intensity modulating said beam with both said variations, a flourescent target for said beam, means for repeatedly sweeping said beam along the same linear path on said target so that different distinctive parts of said path are impacted in turn by said beam and each of said parts repeatedly at instants respectively when said beam is being modulated with successive ones of a distinctive set of said periodic variations, an assemblage of electric storage elements, one for each of said target parts, means under control of said impacted parts respectively for accumulating charges on said elements each of which charges is dependent upon the number of beam impacts on the corresponding target part and also upon the beam energy at time of impact, and means for producing and utilizing voltages the magnitudes of which depend upon said charges respectively.

8. Means for differentiating between variations repeated at a substantially fixed periodicity and variations intermixed therewith which are not of said periodicity comprising means for producing a space-current beam, means for intensity modulating said beam with both said variations, a fluorescent target for said beam, means for repeatedly sweeping said beam along said target so that different distinctive parts of said target are impacted in turn by said beam and each of said parts repeatedly at instants respectively when said beam is being modulated with successive ones of a distinctive set of said first-mentioned variations, an assemblage of electric storage elements, one for each of said target parts, means under control of said impacted parts respectively for accumulating charges on said elements each of which charges is dependent upon the number of beam impacts on the corresponding target part and also upon the beam energy at time of impact, and means operating at a frequency which is much smaller than that of the impact of said beam upon any given target part for producing voltages the magnitudes of which depend upon said charges respectively.

9. The combination of elements as in claim 8 in further combination with means for utilizing said voltages in the production of corresponding visual indications.

10. Means for differentiating between cyclically repeated signals and unwanted variations of random distribution comprising means for producing a beam of electrons intensity modulated with said signals and said unwanted variations, fluorescent target means for said beam, means for sweeping said beam over said target means cyclically at the periodicity of repetition of said signals, means including said target means for producing electrical charges respectively representative of the sums, taken over a plurality of cycles, of the modulations of said beam which correspond in time-position in the different cycles, and means for utilizing said charges periodically after the completion of said plurality of cycles of said sweep.

11. Means for differentiating between cyclically repeated pulse signals and unwanted variations of a random distribution comprising means for producing a beam of electrons intensity modulated with said pulse signals and said unwanted variations, a fluorescent target for said beam, means for sweeping said beam over said fluorescent target to produce a multiplicity of bright spots corresponding to the pulse signals and a flickering background corresponding to the unwanted variations, and means including said target means for producing electrical charges representative of the sum of said pulse signals taken in phase with each other for a number of cycles and other charges representative of the sum of said unwanted variations taken in random phase for a number of cycles.

12. Means for differentiating between cyclically repeated pulse signals and spurious variations of a random distribution and character comprising means for producing a beam of electrons intensity modulated with said pulse signals and said spurious variations, a fluorescent target for said beam, means for cyclically sweeping said beam over said fluorescent target at the repetition frequency of said pulse signals to produce a luminous strip including a multiplicity of bright spots corresponding to the pulse signals and a flickering background corresponding to the spurious variations, an electron camera tube including a target, means for focusing an image of said strip on said fluorescent target upon the target of said camera tube, and means for scanning the image field on said camera tube target at a frequency which is much smaller than the frequency of sweeping the first-mentioned beam over the fluorescent target to produce an image current in which the pulse signals are accentuated with respect to the spurious variations.

13. Means for differentiating between cyclically repeated pulse signals and spurious variations of a random distribution and character comprising means for producing a beam of electrons intensity modulated with said pulse signals and said spurious variations, a fluorescent target for said beam, means for producing an image current from the visual indications on said target produced by the modulated beam, said image current having pulse signals representative of said first-mentioned pulse signals but being spaced apart on a time scale in such a way that the time period between successive ones of said pulse signals in said image current is much greater than that between successive ones of said first-mentioned pulses, and means for utilizing said image current in the production of corresponding visual indications.

14. Means for differentiating between cyclically repeated pulse signals and spurious variations of a random distribution and character comprising means for producing a beam of electrons modulated with said pulse signals and said spurious variations, a fluorescent target for said beam, means for cylically sweeping said beam over said fluorescent target at the repetition frequency of said pulse signals to produce a strip comprising a multiplicity of bright spots corresponding to the pulse signals and a flickering background corresponding to the spurious variations, an electron camera tube, means for focusing an image of said strip on said fluorescent target upon the target of said camera tube, means for scanning the image field of said camera tube target at a frequency which is much smaller than the frequency of sweeping the first-mentioned beam over the fluorescent target to produce an image current in which the pulse signals are accentuated with respect to the spurious variations, a cathode ray oscillograph comprising means for generating a beam of electrons and two sets of deflecting elements for producing deflection in two dimensions, means for applying said image current to one set of said deflecting plates, and means for applying a sweep wave to the other set of deflecting plates, said sweep wave having the same frequency of scanning as the frequency of image field coverage in said electron camera tube.

15. Means for differentiating between time-spaced variations occurring at a definite periodicity and non-periodic variations intermixed therewith comprising means for producing a space-current beam, means for modulating said beam with both said variations, a target for said beam, means for repeatedly sweeping said beam along said target so that different distinctive parts of said target are impacted in turn by said beam and each of said parts repeatedly at instants respectively when said beam is being modulated with successive ones of a distinctive set of said periodic variations, an assemblage of electric storage elements, one for each of said target parts, means under control of said impacted parts respectively for accumulating charges on said elements each of which charges is dependent upon the number of beam impacts on the corresponding target part and also upon the beam energy at time of impact, means operating at a periodicity which is an integral fraction of that of beam impact upon any given target part for producing voltages the magnitudes of which depend upon said charges respectively, a cathode ray oscilloscope comprising means for generating a beam of electrons and two sets of deflecting elements, means for applying said voltages to one of said sets of deflecting elements, and means for applying a sweep wave to the second set of deflecting elements.

16. The combination of elements as in claim 7 in which said assemblage of electric storage elements comprises a mosaic target of an electron camera tube which also includes means for generating a beam of electrons and means for deflecting said beam over said target.

17. The combination of elements as in claim 8 in which the periodicity of said last-mentioned means is of the order of one-twentieth that of the periodicity of beam impact upon any given target part.

18. In combination, means for forming a series of trains of electrical pulses, the pulses in one train being in positions which correspond respectively to the positions of similar pulses in immediately preceding and succeeding trains, a charge storage electrode, electro-optical means for producing on said charge storage electrode a series of charges respectively corresponding in intensity to the pulses in said trains integrated in phase over a period corresponding to the time required for the forming of a plurality of said trains, means for periodically removing said charges within a period of time which is longer than that required to form one complete train in said first-mentioned series to thereby produce a second series of trains of pulses, and means including a cathode ray indicating device for utilizing said last-mentioned series of trains of pulses.

19. In combination, an oscilloscope having a screen with a linear portion thereof adapted to be excited to variable degrees of luminescence, means for causing the beam in said tube to be intensity modulated and swept over said linear portion only, an array of photoelectric elements arranged exteriorly of said oscilloscope, means for imaging said linear portion upon said array so that each element receives the light from a corresponding portion of the screen traversed by the cathode ray beam and converts said received light into an electric charge, and means for serially removing said charges and transmitting the same as an electric current.

20. In combination, an oscilloscope having a screen with a linear portion thereof adapted to be excited to variable degrees of luminescence, means for causing the beam in said tube to be swept over said linear portion only, an array of photoelectric elements arranged exteriorly of said oscilloscope, means for imaging said linear portion upon said array so that each element receives the light from a corresponding portion of the screen traversed by the cathode ray beam and converts said received light into an electric charge, means for serially removing said charges and transmitting the same as an electric current, a second oscilloscope, and means for utilizing the electric current produced by said charges to form a two-dimensional image on the screen of said second oscilloscope.

JACK A. MORTON.

REFERENCES CITED

The following references are of record in the file of this patent:

UNITED STATES PATENTS

| Number | Name | Date |
|---|---|---|
| 2,175,573 | Schroter | Oct. 10, 1939 |
| 2,191,565 | Henroteau | Feb. 27, 1940 |
| 2,219,021 | Riesz | Oct. 22, 1940 |
| 2,293,899 | Hanson | Aug. 25, 1942 |
| 2,403,562 | Smith | July 9, 1946 |
| 2,412,669 | Bedford | Dec. 17, 1946 |
| 2,412,670 | Epstein | Dec. 17, 1946 |
| 2,415,981 | Wolff | Feb. 18, 1947 |
| 2,451,000 | Smith | Oct. 12, 1948 |

OTHER REFERENCES

Radar System Engineering by Ridenour; MIT Series No. 1, McGraw-Hill, pages 164 and 165.